United States Patent
Busaba et al.

(10) Patent No.: US 10,120,802 B2
(45) Date of Patent: *Nov. 6, 2018

(54) TRANSACTIONAL MEMORY COHERENCE CONTROL

(71) Applicant: International Business Machines Corporation, Armonk, NY (US)

(72) Inventors: Fadi Y. Busaba, Poughkeepsie, NY (US); Harold W. Cain, III, Raleigh, NC (US); Michael Karl Gschwind, Chappaqua, NY (US); Valentina Salapura, Chappaqua, NY (US); Eric M. Schwarz, Gardiner, NY (US); Timothy J. Slegel, Staatsburg, NY (US)

(73) Assignee: International Business Machines Corporation, Armonk, NY (US)

(*) Notice: Subject to any disclaimer, the term of this patent is extended or adjusted under 35 U.S.C. 154(b) by 245 days.

This patent is subject to a terminal disclaimer.

(21) Appl. No.: 14/862,248

(22) Filed: Sep. 23, 2015

(65) Prior Publication Data

US 2017/0083442 A1   Mar. 23, 2017

(51) Int. Cl.
| | |
|---|---|
| *G06F 12/00* | (2006.01) |
| *G06F 12/0817* | (2016.01) |
| *G06F 9/46* | (2006.01) |
| *G06F 12/0815* | (2016.01) |
| *G06F 12/084* | (2016.01) |
| *G06F 3/06* | (2006.01) |

(52) U.S. Cl.
CPC ........ *G06F 12/0828* (2013.01); *G06F 3/0619* (2013.01); *G06F 3/0659* (2013.01); *G06F 3/0673* (2013.01); *G06F 9/467* (2013.01); *G06F 12/084* (2013.01); *G06F 12/0815* (2013.01); *G06F 2212/621* (2013.01)

(58) Field of Classification Search
CPC .. G06F 12/0828; G06F 3/0673; G06F 3/0659; G06F 3/0619; G06F 12/084; G06F 12/0815; G06F 9/467; G06F 2212/621
See application file for complete search history.

(56) References Cited

U.S. PATENT DOCUMENTS

| | | |
|---|---|---|
| 5,113,514 A | 5/1992 | Albonesi et al. |
| 6,349,361 B1 | 2/2002 | Altman et al. |

(Continued)

OTHER PUBLICATIONS

Busaba et al., "Transactional Memory Coherence Control", U.S. Appl. No. 14/931,912, filed Nov. 4, 2015, 75 pages.

(Continued)

*Primary Examiner* — Matthew Bradley
*Assistant Examiner* — Alan Otto
(74) *Attorney, Agent, or Firm* — Isaac J. Gooshaw; Pooya Shoghi Ghalehshahi

(57) ABSTRACT

A computer-implemented method includes, in a transactional memory environment comprising a plurality of processors, identifying one or more selected processors and identifying one or more coherence privilege state indicators. The one or more coherence privilege state indicators are associated with the one or more selected processors. A coherence privilege behavioral pattern is determined based on the one or more coherence privilege state indicators. A corresponding computer program product and computer system are also disclosed.

14 Claims, 8 Drawing Sheets

(56) References Cited

U.S. PATENT DOCUMENTS

| | | | |
|---|---|---|---|
| 6,539,440 B1* | 3/2003 | Stracovsky | G06F 12/0215 710/20 |
| 7,269,694 B2 | 9/2007 | Tremblay et al. | |
| 8,209,499 B2 | 6/2012 | Chou | |
| 2005/0021914 A1 | 1/2005 | Chung | |
| 2008/0244354 A1 | 10/2008 | Wu et al. | |
| 2010/0011171 A1 | 1/2010 | Cousin et al. | |
| 2010/0162247 A1 | 6/2010 | Welc et al. | |
| 2010/0332770 A1 | 12/2010 | Dice et al. | |
| 2011/0307689 A1* | 12/2011 | Chung | G06F 9/3004 712/234 |
| 2012/0005530 A1 | 1/2012 | Marathe et al. | |
| 2012/0159084 A1 | 6/2012 | Pohlack et al. | |
| 2012/0198214 A1 | 8/2012 | Gadre et al. | |
| 2012/0210162 A1 | 8/2012 | Gara et al. | |

OTHER PUBLICATIONS

IBM, List of IBM Patents or Patent Applications Treated as Related, Appendix P, dated Nov. 4, 2015, 2 pages.

Holzle et al., "Optimizing Dynamically-Typed Object-Oriented Languages With Polymorphic Inline Caches", Computer Systems Laboratory, Stanford University, Stanford, CA 94305, Published in ECOOP '91 proceedings, Springer Verlag Lecture Notes in Computer Science 512, Jul. 1991, pp. 1-18, <http://hoelzle.org/publications/ecoop91.pdf>.

Jacobi et al., "Transactional Memory Architecture and Implementation for IBM System z", Proceedings 2012 IEEE/ACM 45th International Symposium on Microarchitecture MICRO-45, presented Dec. 1-5, 2012, pp. 25-36, Copyright © 2012 by the Institute of Electrical and Electronics Engineers, Inc.

Johnson, Ross Evan, "Extending the Scalable Coherent Interface for Large-Scale Shared-Memory Multiprocessors", A thesis submitted at the University of Wisconsin-Madison, 1993, 277 pages.

Mak et al., "IBM System z10 Processor Cache Subsystem Microarchitecture", IBM J. Res. & Dev. vol. 53, No. 1, Paper 2, 2009, pp. 2:1-2:12.

McDonald, Austen, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

Pascual, Ricardo Fernandez, "Fault-tolerant Cache Coherence Protocols for CMPs", A dissertation submitted at the Universidad De Murcia, Jun. 2009, 210 pages.

Saez, Bias Antonio Cuesta, "Efficient Techniques to Provide Scalability for Token-based Cache Coherence Protocols", A dissertation submitted at the Technical University of Valencia, 2009, 220 pages, see Chapter 3, p. 43.

Scherer, III et al., "Advanced Contention Management for Dynamic Software Transactional Memory", PODC'05, Jul. 17-20, 2005, Las Vegas, Nevada, Copyright © 2005, ACM, pp. 1-9.

Tomic et al., "EazyHTM: Eager-Lazy Hardware Transactional Memory", MICRO'09, Dec. 12-16, 2009, New York, NY, Copyright © 2009, ACM, pp. 1-11.

IBM, "Principles of Operation", 5A22-7832-09; Tenth Edition, Sep. 2012, Copyright © 1990-2012, International Business Machines Corporation, 1,568 Pages.

Intel, "Intel® Architecture Instruction Set Extensions Programming Reference", 319433-012A, Feb. 2012, pp. 1-604.

SPI DST, et al., "A Cache Technique for Synchronization Variables in Highly Parallel, Shared Memory Systems", IP.com Electronic Publication: Apr. 1, 2007, IP.com No. IPCOM000149393D, 25 pages.

"Implementing locks in a shared-memory multiprocessor using a simplified coherence protocol", IP.com Electronic Publication: Sep. 24, 2010, IP.com No. IPCOM000200052D, 6 pages.

\* cited by examiner

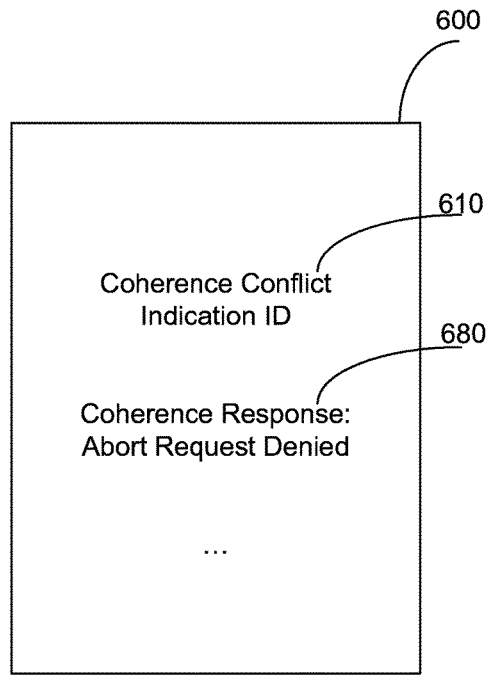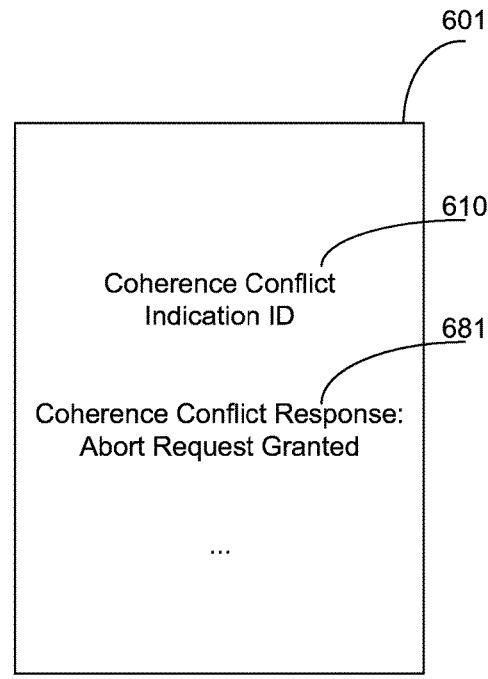
FIG. 6A  FIG. 6B
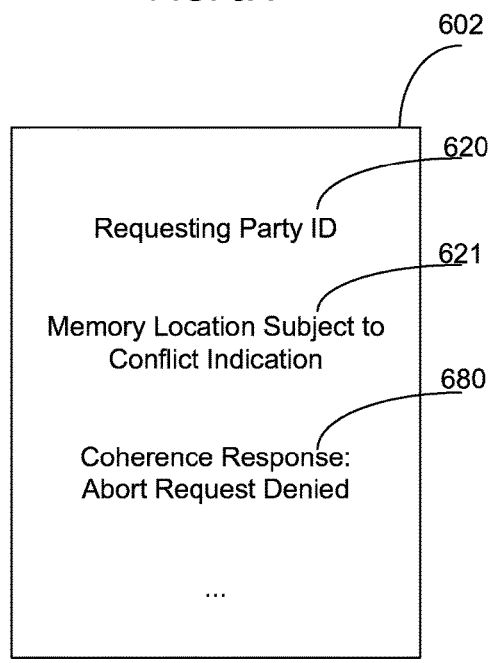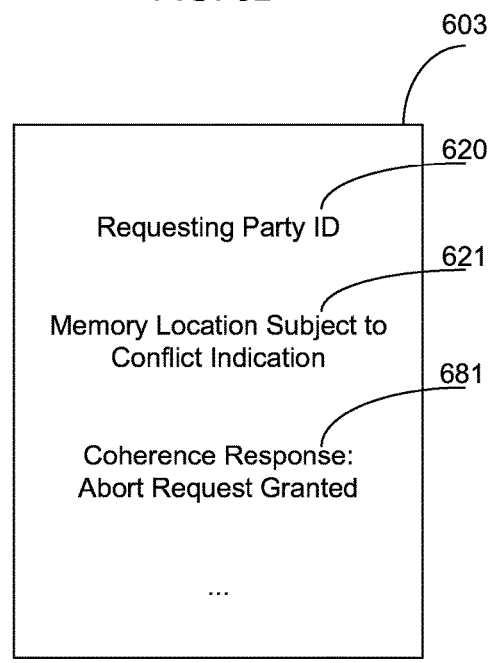
FIG. 6C  FIG. 6D

TRANSACTIONAL MEMORY COHERENCE CONTROL

BACKGROUND

This disclosure relates generally to resource access management in a multiprocessor computing environment, and more specifically to transactional memory coherence control mechanisms.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion simply TM) have been introduced, wherein a group of instructions, called a transaction, operate in an atomic manner on a data structure in memory as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

U.S. Patent Application Publication No. US20080244354 A1 titled "Apparatus and method for redundant multithreading with recovery" published Oct. 2, 2008 and incorporated by reference herein teaches:

A method and apparatus for reducing the effect of soft errors in a computer system is provided. Soft errors are detected by combining software redundant threading and instruction duplication. Upon detection of a soft error, errors are recovered through the use of software check pointing/rollback technology. Reliable regions are identified by vulnerability profiling and redundant multi-threading is applied to the identified reliable regions. U.S. Patent Application Publication No. US20080244354 A1 (published Oct. 2, 2008).

U.S. Patent Application Publication No. US20120210162 A1 titled "State recovery and lockstep execution restart in a system with multiprocessor pairing" published Aug. 16, 2012 and incorporated by reference herein teaches:

System, method and computer program product for a multiprocessing system to offer selective pairing of processor cores for increased processing reliability. A selective pairing facility is provided that selectively connects, i.e., pairs, multiple microprocessor or processor cores to provide one highly reliable thread (or thread group). Each paired microprocessor or processor cores that provide one highly reliable thread for high-reliability connect with a system components such as a memory "nest" (or memory hierarchy), an optional system controller, and optional interrupt controller, optional I/O or peripheral devices, etc. The memory nest is attached to a selective pairing facility via a switch or a bus. Each selectively paired processor core is includes a transactional execution facility, wherein the system is configured to enable processor rollback to a previous state and reinitialize lockstep execution in order to recover from an incorrect execution when an incorrect execution has been detected by the selective pairing facility. U.S. Patent Application Publication No. US20120210162 A1 (published Aug. 16, 2012).

U.S. Pat. No. 7,418,555, titled "Multiprocessor system and method to maintain cache coherence," issued Aug. 26, 2008, teaches:

A multiprocessor system may have a plurality of processors and a memory unit. Each of the processors may include at least one cache memory. The memory unit may be shared by two of the processors. The multiprocessor system may further include a control unit. If the multiprocessor system receives an access request for a data block of the memory unit from one processor. The processors may also include a processing unit. When the processor shares a data block, the processing unit may invalidate the shared data block in the cache memory, write the shared data block from the write buffer to a memory unit, and forward an interrupt completion response to a control unit. U.S. Pat. No. 7,418,555, at Abstract (issued Aug. 26, 2008).

US Patent Application Publication No. U.S. Pat. No. 8,015,363 B2, titled "Cache consistency in a multiprocessor system with shared memory," published Jan. 14, 2010, teaches:

A process to make the cache memory of a processor consistent includes the processor processing a request to write data to an address in its memory marked as being in the shared state. The address is transmitted to the other processors, data are written into the processor's cache memory and the address changes to the modified state. An appended memory associated with the processor memorizes the address, the data and an associated marker in a first state. The processor then receives the address with an indicator. If the indicator indicates that the processor must perform the operation and if the associated marker is in the first state, the data are kept in the modified state. If the indicator does not indicate that the processor must perform the operation and if the processor receives an order to mark the data to be in the invalid state, the marker changes to a second state. U.S. Patent Application Publication No. U.S. Pat. No. 8,015,363 B2, at Abstract (published Jan. 14, 2010).

SUMMARY

A computer-implemented method includes, in a transactional memory environment comprising a plurality of processors, identifying one or more selected processors and identifying one or more coherence privilege state indicators. The one or more coherence privilege state indicators are associated with the one or more selected processors. A coherence privilege behavioral pattern is determined based on the one or more coherence privilege state indicators. A corresponding computer program product and computer system are also disclosed.

BRIEF DESCRIPTION OF THE DRAWINGS

FIGS. 6A, 6B, 6C, and 6D depict operational examples of coherence response indications, in accordance with at least one embodiment of the present invention.

DETAILED DESCRIPTION

Figure 1:
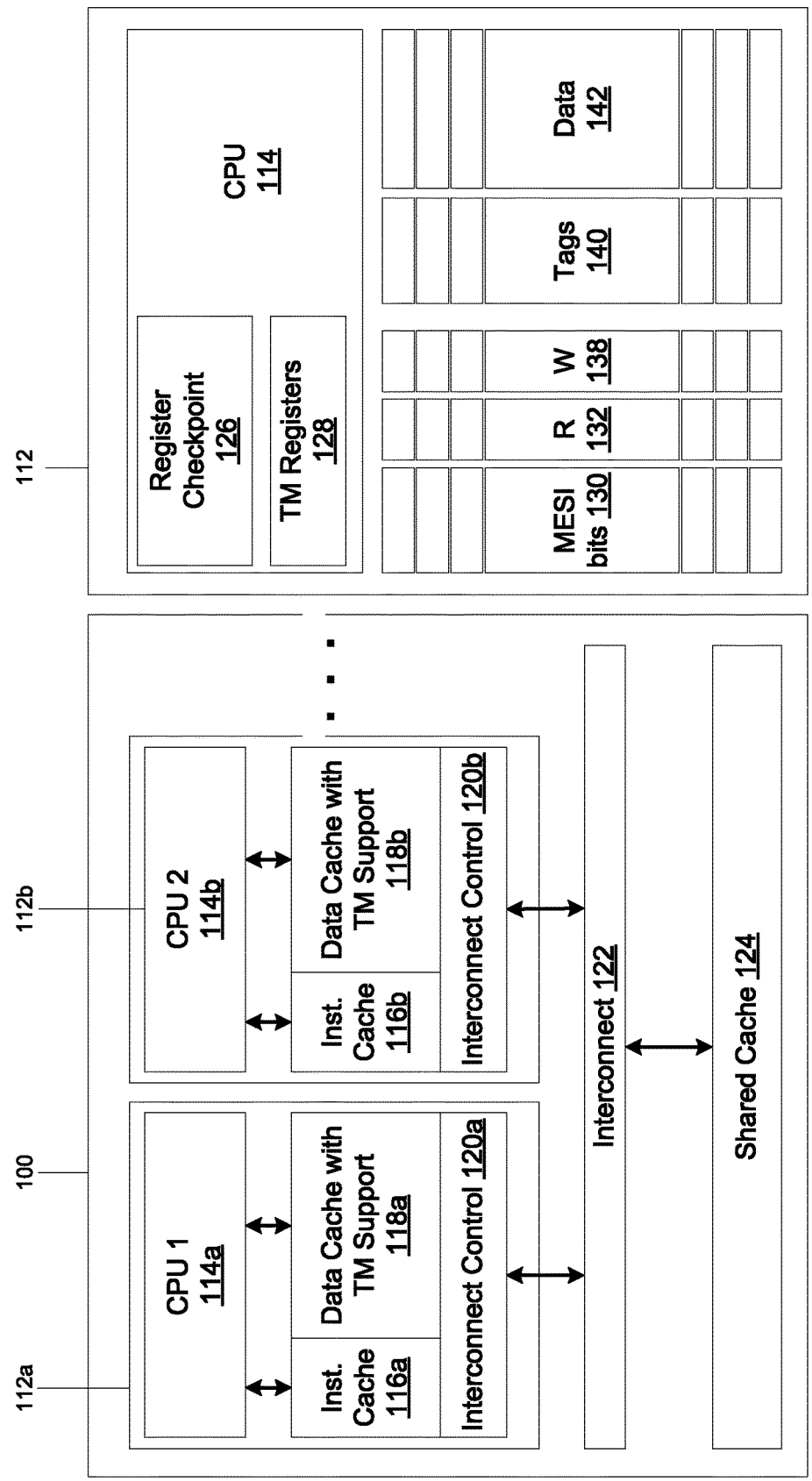
FIGS. 1A and 1B depict an example multicore Transactional Memory environment, in accordance with at least one embodiment of the present invention.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel® TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel® TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel® TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel® TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel® TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel® TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write-set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel® TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel® TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT

CPUID

PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel® TSX implementations may choose to abort the transactional execution if these flags need to be updated. Further, a processor's page-table walk may generate accesses to its own transactionally written but uncommitted state. Some Intel® TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel® recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To ensure that transactions appear to be performed atomically, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIGS. 1A and 1B depict an example of a multicore TM environment. FIG. 1A shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 166b for caching instructions from memory to be executed and a Data Cache 118a, 118b with TM support for caching data (operands) of memory locations to be operated on by the CPU 114a, 114b (in FIG. 1A, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 1B shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

|  |  | VERSIONING | |
| --- | --- | --- | --- |
|  |  | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
|  | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write-set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM® zEnterprise EC12 Enterprise Server Embodiment

The IBM® zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

| | | | |
|---|---|---|---|
| | LHI | R0,0 | *initialize retry count=0 |
| loop | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | . . . perform operation . . . | | |
| | TEND | | *end transaction |
| | . . . . . . . . . . . . | | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | . . . potentially wait for lock to become free . . . | | |
| | J | loop | *jump back to retry fallback |
| | OBTAIN | lock | *using Compare&Swap |
| | . . . perform operation . . . | | |
| | RELEASE | lock | |
| | . . . . . . . . . . . . | | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM® zEnterprise EC12 introduces the concept of constrained transactions; under normal conditions, the CPU 114 assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM®'s Transactional Execution architecture is further described in z/Architecture®, Principles of Operation, Tenth Edition, SA22-7832-09 published September 2012 from IBM®, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM®'s zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 2:
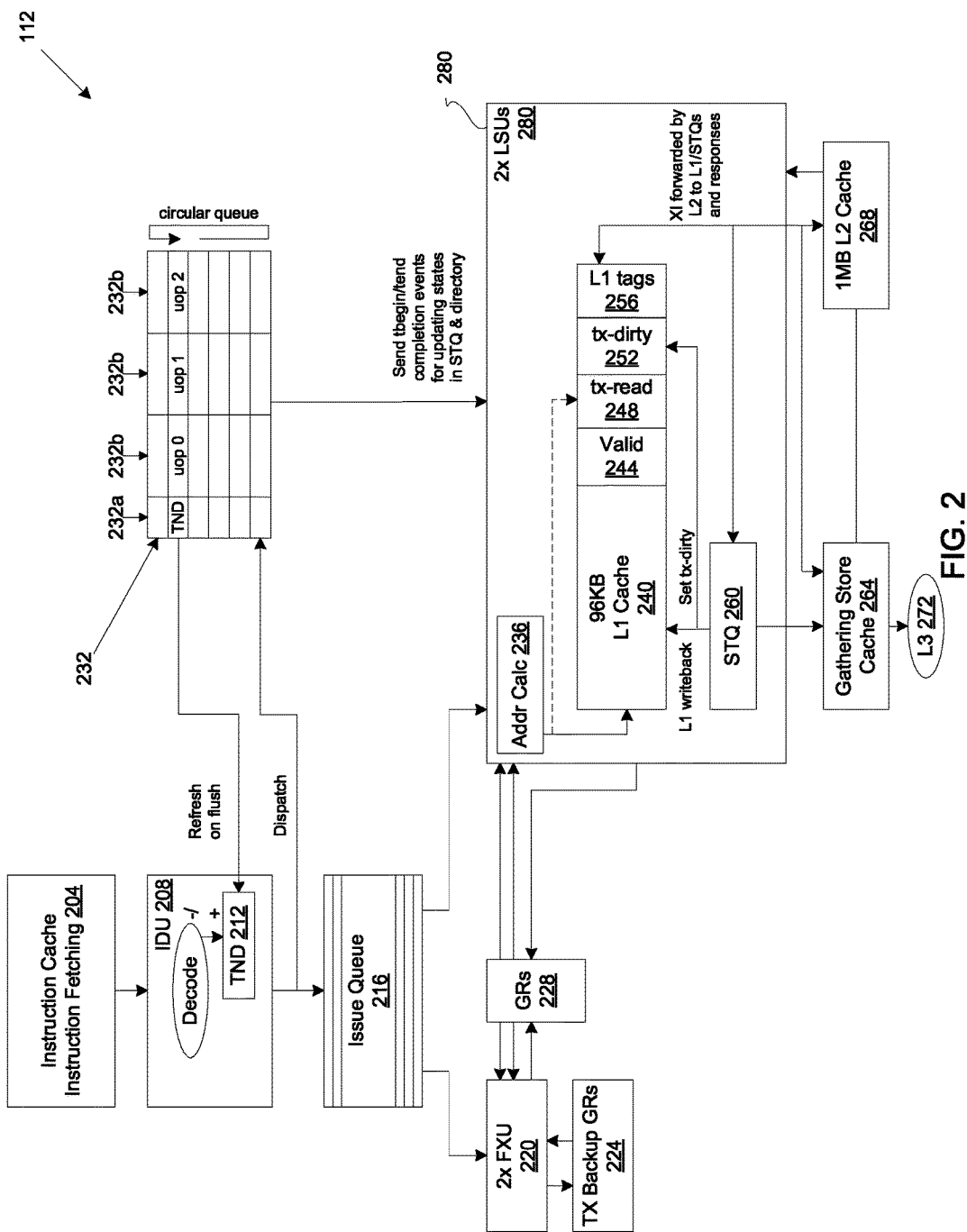
FIG. 2 depicts example components of an example CPU, in accordance with at least one embodiment of the present invention.

With reference to FIG. 2, the IBM® zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM® z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 2 depicts example components of an example CPU environment 112, including a CPU 114 and caches/components with which it interacts (such as the those depicted in FIGS. 1A and 1B). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction.

When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop 2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Execution

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 1B) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 232 is a circular queue of 64 entries, each entry holding 128 bytes of data with byte-precise valid bits. In non-transactional operation, when a store is received from the LSU 280, the store cache checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM® mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort subroutine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

"Efficient Techniques to Provide Scability for Token-based Cache Coherence Protocols," 2009, teaches in part:

> According to the persistent request mechanism, a processor issues a persistent request when it detects it may be starving. The substrate arbitrates among the outstanding persistent requests to determine the current active request for each block. The substrate sends the active persistent requests to all system components. These components must both remember all active persistent requests and redirect their tokens (those tokens currently present and those to be received in the future) to the requesting processor until the requester explicitly deactivates its own persistent request. The initiator deactivates its requests when it has received sufficient tokens to perform the intended memory operation.
>
> Several design options of the persistent request mechanism have been proposed. The simplest implementation uses a single centralized arbiter. According to it, when a starvation situation is detected, a persistent request is directed to the arbiter. The arbiter stores all the received persistent requests and activates a single one by informing all processors and the block's home memory module. These components each remember the active persistent request using a hardware persistent request table. In this approach, each persistent request table has a single entry with four fields: a valid bit, a physical address, a read/write bit (to distinguish between read and write requests), and a processor number. While a persistent request is active for a block, each component must forward all the block's tokens to its requester. The components will also forward tokens that arrive later, because the request persists until the requester explicitly deactivates it. Once the requester has (1) received enough tokens to perform the memory operation, (2) received valid data, and (3) observed the activation of its own persistent request, it sends a message to the arbiter. The arbiter deactivates the persistent request by informing all components, which delete the entry from their tables. "Efficient Techniques to Provide Scability for Token-based Cache Coherence Protocols," at Chapter 3, Page 43 (2009).

Figure 3:
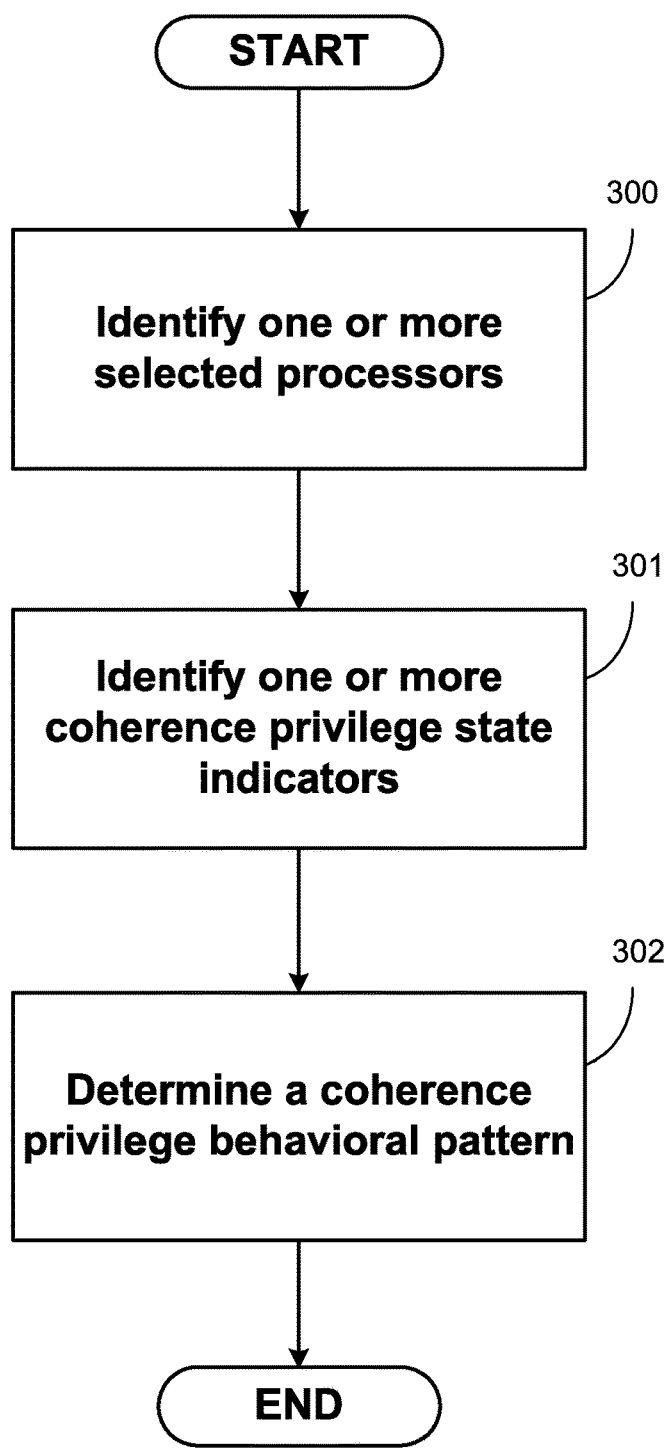
FIG. 3 depicts a flow chart diagram illustrating a coherence privilege control program, in accordance with at least one embodiment of the present invention.

FIG. 3 depicts the coherence privilege control program. In a transactional memory environment comprising a plurality of processors, the program determines a coherence privilege behavioral pattern based on one or more coherence privilege state indicators associated with one or more selected processors, in accordance with at least one embodiment of the present invention. At step 300, the program identifies one or more selected processors. At step 301, the program identifies one or more privilege state indicators associated with the one or more selected processors. At step 302, the program determines a coherence privilege behavioral pattern based on the one or more coherence privilege state indicators.

The computing environment for the present invention may comprise one or more processors (including one or more computer processors) interacting with each other in a transactional memory framework. The coherence privilege control program may associate one or more coherence privilege state indicators to a processor. The coherence privilege state indicators comprise information about the coherence privilege states associated with the processor. The coherence privilege state refers to the level of privilege associated with the processor in coherence control interactions with other processors. For instance, in at least one embodiment of the present invention, the coherence privilege control program causes a processor with a coherence privilege state indicator denoting a high level of privilege to refuse to abort a transaction upon receiving an abort request from other processors. In other embodiments, the program may causes a processor with a coherence privilege state indicator denoting a high level of privilege to refuse different coherence-based requests from other processors.

In some embodiments, the coherence privilege control program is implemented through independent determination of coherence privilege states and coherence privilege behavioral patterns by the processors, without the need for external determination of one or both of those variable properties by third-party components. In an exemplary embodiment, a processor intelligently determines the coherence privilege state associated with the processor based on one or more coherence privilege guidelines available to it, and determines a coherence privilege behavioral pattern based on the coherence privilege states.

In alternative embodiments, a third-party unit, comprising one or more computer components, determines either or both of the coherence privilege states and coherence privilege behavioral patterns associated with the processors. In an exemplary embodiment, a processor sends a request for change in coherence privilege state to the third-party unit, referred to herein as "the coherence privilege arbitration unit." The coherence privilege arbitration unit determines if the processor is eligible for the requested change in coherence privilege state based on one or more coherence privilege guidelines available to it. If the coherence privilege arbitration unit determines that the requesting processor is eligible for the requested change in coherence privilege state, it determines a coherence privilege behavioral pattern based on the modified coherence privilege state and sends indications of the modified coherence privilege state and coherence privilege behavioral pattern to the requesting processor. The processor modifies its coherence privilege state indicator based on the indications received from the coherence privilege arbitration unit. The processor generates code to comply with the coherence privilege behavioral pattern, based on indications received from the coherence privilege arbitration unit.

The coherence privilege control program identifies one or more coherence privilege state indicators associated with one or more selected processors at step 301. In some embodiments, the coherence privilege state indicators reside in the registers or other computer readable storage media located in the processors with which those indicators are associated. In other embodiments, the coherence privilege state indicators are in other computer readable storage media directly or indirectly accessible to the processors. In some embodiments, the coherence privilege state indicators directly comprise information denoting the coherence privilege state of a processor, while in other embodiments the coherence privilege state indicators comprise a reference to other computer readable storage media locations comprising the coherence privilege state of a processor.

The range of the possible states that a coherence privilege state indicators may indicate can vary from implementation to implementation. In some embodiments, referred to herein as "two-state coherence range" systems, the one or more coherence privilege state indicators are in a state selected from the group consisting of a regular state 410 and a super-core state 411. In some embodiments, referred to herein as "three-state coherence range systems," the one or more coherence privilege state indicators are in a state selected from the group consisting of a regular state 410, a super-core state 411, and a "priority yield" state 412. In other embodiments, the coherence privilege state indicators may indicate additional or different states.

In some embodiments, different processors have different range of possible states that their associated coherence privilege state indicators may indicate. For instance, a first set of processors will only be able to be in a regular state 410, while a second set of processors may be in the regular state 410 or the priority yield state 412, and a third set of processors may be in the regular state 410, the super-core state 411, and the "priority yield" state 412.

In some embodiments, different processors may, at different times during their operation, have different ranges of possible states that their associated coherence privilege state indicators may indicate. For instance, Processor A may only be in the regular state 410 at time $t_1$, while it may be in the regular state 410 or the priority yield state 412 at time $t_2$, and it may be in the regular state 410, the priority yield state 412, or the super-core state 411 at time $t_3$.

Figure 4A:
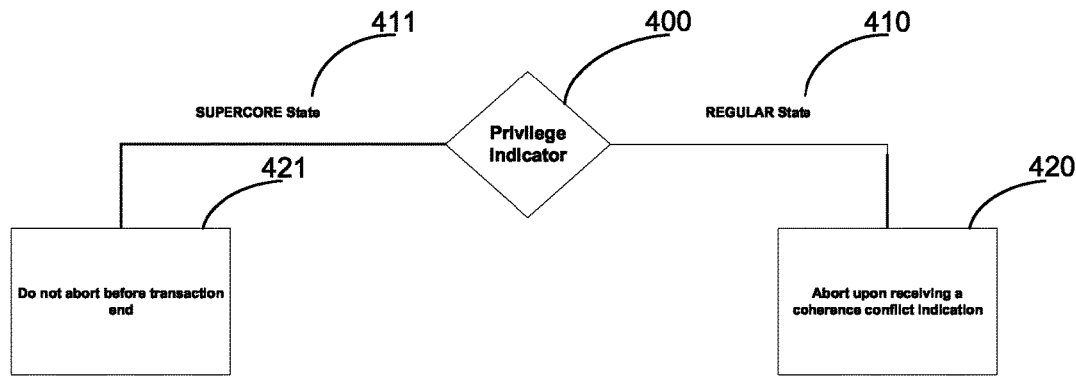
FIGS. 4A and 4B depict flow chart diagrams illustrating examples of associations between coherence privilege state indicators and coherence privilege behavioral patterns, in accordance with at least one embodiment of the present invention.
Figure 4B:
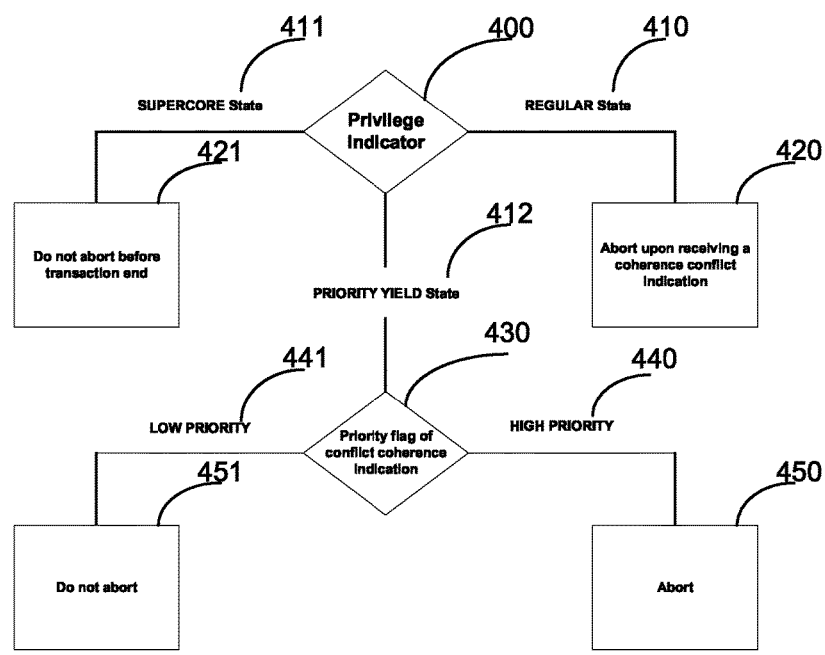

The coherence privilege control program determines a coherence privilege behavioral pattern associated with a processor based on the one or more coherence privilege state indicators 400 at step 302. FIGS. 4A and 4B depict examples of determination of coherence privilege behavioral patterns based on coherence privilege state indicators 400, in accordance with at least one embodiment of the present invention. In the embodiments depicted by FIG. 4A, in a two-state coherence range system, the program determines a coherence privilege behavioral pattern commanding that the processor "abort upon receiving a coherence conflict indication" 420 when the coherence privilege state indicator 400 denotes a regular state 410, while the program determines a coherence privilege behavioral pattern commanding that the processor "do not abort before transaction end" 421 when the coherence privilege state indicator 400 denotes a super-core state 411.

FIG. 4B depicts examples of determination of coherence privilege behavioral patterns based on coherence privilege state indicators 400 in a three-state coherence range system, in accordance with at least one embodiment of the present invention. In the embodiments depicted by FIG. 4B, in addition to the determinations based on the regular state and the super-core state explained above in relation to FIG. 4A, the coherence privilege control program determines a third coherence privilege behavioral pattern based on a coherence privilege state indicator 400 denoting a priority yield state 412. Based on the aforementioned coherence privilege behavioral pattern, upon receiving an indication of a conflict in resource access that may give rise to read or write coherence issues (a "coherence conflict indication," such as an abort request), the coherence privilege control program checks the priority flag 430 of that coherence conflict indication. If the priority flag 430 is high 440, the processor aborts 450 in response to the coherence conflict indication. If the priority flag 430 is low 441, the processor does not abort 451 in response to the coherence conflict indication.

In some embodiments, the determination of coherence privilege behavioral pattern associated with a processor is based on other factors in addition to the state denoted by the coherence privilege state indicators, such as one or more of time, rate of access to memory or other shared resources by all the processors collectively, and the memory-intensiveness of the tasks being performed by a transaction being executed by the processor. For instance, in one embodiment, the coherence privilege control program determines a coherence privilege behavioral pattern commanding that the processor "do not abort before transaction end" 421 if all four of the following conditions are met: (1) the one or more coherence privilege state indicators associated with the processor are in super-core state; (2) the time is between 9:00 AM and 9:00 PM local time; (3) the current rate of access to memory by all processors collectively is below 100 accesses per second; and (4) the successful execution of the transaction currently being executed by the processor is estimated to require more than 200 memory accesses.

In at least some embodiments, the coherence privilege control program assigns a coherence privilege behavioral pattern to the processor. In some embodiments, the program generates computer instructions 810 (including one or more machine-level instructions) corresponding to the assigned coherence privilege behavioral pattern during execution time. In some embodiments, one or more coherence privilege behavioral patterns associated with one or more selected processors are implemented as circuitry, and a correct coherence behavioral pattern is selected by selecting the corresponding circuitry. In other embodiments, the coherence privilege control program causes the execution of previously stored and compiled computer instructions 810 (including one or more machine-level instructions) corresponding to the assigned coherence privilege behavioral pattern. In other embodiments, the program causes the compilation and execution of previously stored computer instructions 810 corresponding to the assigned coherence privilege behavioral pattern.

In some embodiments, the coherence privilege control program receives a coherence conflict indication caused to be sent by one or more requesting parties, determines a coherence response based on the coherence privilege behavioral pattern, and communicates a coherence response indication compromising the coherence response to a recipient group comprising the one or more requesting parties. In an exemplary embodiment, the coherence privilege control program receives a coherence conflict indication from one or more requesting parties (such as one or more processors, including one or more computer processors). The program determines a coherence response to the coherence conflict indication based on the coherence privilege behavioral pattern assigned to the processor receiving the coherence conflict indication. The program communicates a coherence response indication comprising the coherence response to the requesting parties.

In some embodiments, determining the coherence privilege behavioral pattern comprises receiving a coherence conflict indication caused to be sent by one or more requesting parties, aborting a transaction being executed by the one or more selected processors if the one or more coherence privilege state indicators are in a regular state, and refusing to abort the transaction if the one or more coherence privilege state indicators are in a super-core state. In an exemplary embodiment, in a two-state coherence range system, the coherence privilege control program causes a processor to abort a transaction the processor is executing if the coherence privilege state indicators associated with the processor are in regular state, and to refuse to abort a transaction the processor is executing if the coherence privilege state indicators associated with the processor are in super-core state.

When a requesting party (such as one or more processors, including one or more computer processors) determines a (potential or actual) conflict in access to shared resources in a way that may give rise to read or write coherence issues, it causes a coherence conflict indication to be sent to other parties to the coherence conflict. The coherence conflict indication may comprise one or more requests, such as a request for abort of the one or more transactions being executed by other parties to the (potential or actual) coherence conflict.

In some embodiments, the coherence conflict indication will be in the form of one or more computer instructions (including one or more machine level instructions) caused to be executed by the other parties to the coherence conflict. In some other embodiments, the requesting party causes the coherence conflict indication to be sent by manipulating one or more computer readable storage media locations accessible to the other parties to the coherence conflict. In some embodiments, the coherence conflict indication comprise one or more identifying markers. In some of those embodiments, the coherence conflict indication comprises indications of the requesting parties and the computer readable storage media locations subject to the coherence conflict indication.

In some embodiments, the coherence conflict indication may include requests for data or requests for cache line coherence transitions (for instance, the request for transition from the Modified state to Shared state in the MESI coherence framework with respect to a cache line). In some embodiments, the coherence conflict indication includes coherence-based requests other than an abort request.

Figure 5A:
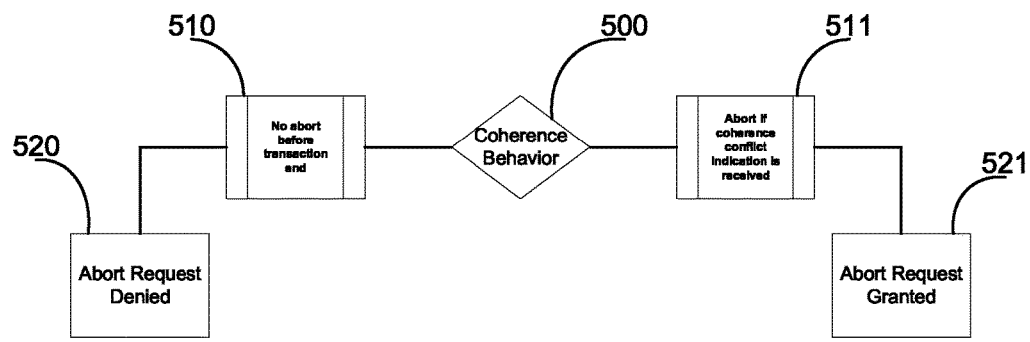
FIGS. 5A and 5B depict flow chart diagrams illustrating examples of coherence response determination, in accordance with at least one embodiment of the present invention.
Figure 5B:
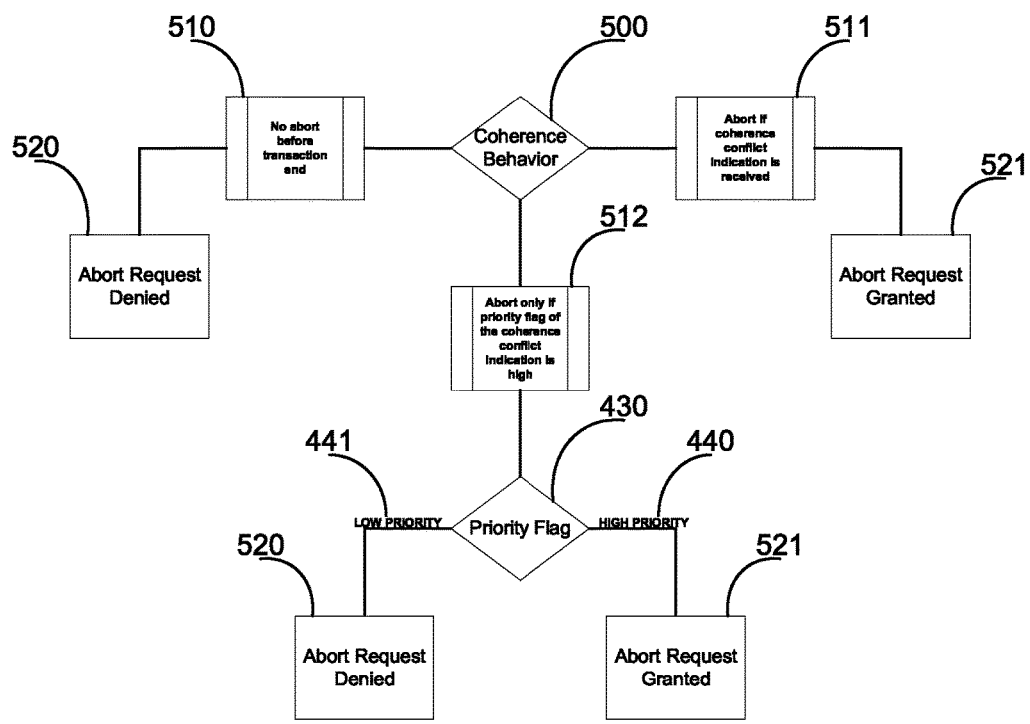

The coherence privilege control program determines a coherence response based on the coherence privilege behavioral pattern of a processor receiving a coherence conflict indication. FIGS. 5A and 5B depicts examples of coherence response determination based on different coherence privilege behavioral patterns in a two-state coherence range system and a three-state coherence range system respectively, in accordance with the embodiment of the present invention.

In the embodiments depicted in FIGS. 5A and 5B, if the coherence privilege behavioral pattern 500 commands the coherence privilege control program to cause the processor to "not abort before transaction end" 510, then the program determines a coherence response comprising the denial of an abort request 520 contained in a coherence conflict indication. If the coherence privilege behavioral pattern 500 commands the coherence privilege control program to cause the processor to "abort if coherence conflict indication is received" 511, then the program determines a coherence response comprising the grant of the abort request 521.

In the embodiment depicted in FIG. 5B, if the coherence privilege behavioral pattern 500 commands the coherence privilege control program to cause the processor to "abort only if the priority flag of the coherence conflict indication is high" 512, then the program determines a coherence response comprising the denial of the abort request 520 if the priority flag 430 is low 441 and the grant of the abort request 521 if the priority flag 430 is high 440.

In some embodiments, the determination of coherence response from a processor is based on other factors in addition to coherence privilege behavioral pattern 500 assigned to the processor, such as one or more of time, rate of access to memory or other shared resources by all the processors collectively, and the memory-intensiveness of the tasks being performed by a transaction being executed by the processor. For instance, in one embodiment, the coherence response comprising the denial of an abort request 520 will only be determined if all of the following four conditions are met: (1) the coherence privilege behavioral pattern 500 commands the processor to "abort if coherence conflict indication is received" 511; (2) the time is between 9:00 AM and 9:00 PM local time; (3) the current rate of access to memory by all processors collectively is below 100 accesses per second; and (4) the successful execution of the transaction currently being executed by the processor is estimated to require more than 200 memory accesses.

In some embodiments, a coherence response indication comprises data requested by the coherence conflict indication. In some embodiments, a coherence response comprises cache line coherence transitions (for instance, the transition from the Modified state to Shared state in the MESI coherence framework with respect to a cache line). In some embodiments, a coherence response comprises indications of data requested by the coherence conflict indication and/or indications of cache line coherence transitions.

The coherence privilege control program communicates a coherence response indication, comprising the coherence response, to the requesting parties. FIGS. 6A, 6B, 6C, and 6D depict examples of coherence response indications communicated by the program to the requesting parties.

In some embodiments, the coherence conflict indication comprise one or more identifying markers, and the coherence response indication comprise an indication of the one or more identifying markers. In some embodiments, the identifying marker is a unique value associated with the coherence conflict indication, while in other embodiments the identifying marker may be a combination of one or more properties associated with the coherence conflict indication, such as an indication of the one or more requesting parties and/or an indication of the one or more memory locations subject to the request contained in the coherence conflict indication.

FIGS. 6A and 6B are examples of coherence response indications comprising a coherence conflict indication ID 610. In the example depicted by FIG. 6A, the coherence response indication 600 comprises a coherence response denying the abort request 680 contained in the coherence conflict indication. In the example depicted by FIG. 6B, the coherence response indication 601 comprises a coherence response granting the abort request 681 contained in the coherence conflict indication.

FIGS. 6C and 6D are examples of coherence response indications comprising a requesting party ID 620 and an indication of the memory location subject to the coherence conflict indication 621. In the example depicted by FIG. 6C, the coherence response indication 602 comprises a coherence response denying the abort request 680 contained in the coherence conflict indication. In the example depicted by FIG. 6D, the coherence response indication 603 comprises a coherence response granting the abort request 681 contained in the coherence conflict indication.

In some embodiments, the transactional abort that occurs following the grant of an abort request is a coherence response indication communicated to the requesting parties and comprising an indication of the coherence response to grant an abort request. In some of those embodiments, the coherence privilege control program communicates an explicit coherence response indication substantially in the form of FIGS. 6A and 6C only in the case of a rejection of the abort request contained in a coherence conflict indication.

In some embodiments, the coherence conflict indication and the coherence response indication directly comprise information denoting the one or more identifying markers, while in other embodiments the coherence conflict indication comprise a reference to other computer readable storage media locations comprising the identifying markers.

In some embodiments, the coherence privilege control program receives a coherence privilege modification indication denoting a request for change in the one or more coherence privilege state indicators, and determines whether to approve the coherence privilege modification indication based on one or more coherence privilege guidelines. In an exemplary embodiment, the coherence privilege control program receives a coherence privilege modification indication denoting a request for change in coherence privilege state indicators associated with a processor, and determines whether to approve the request contained in the coherence privilege modification indication based on one or more coherence privilege guidelines available to it.

In some embodiments, the coherence privilege modification indication will be in the form of one or more computer instructions (including one or more machine level instructions) caused to be executed by the computer component responsible for determining the approval or denial of the request contained in the indication. In some embodiments, the coherence privilege modification indication will be triggered if the number of aborts of a transactions reaches a certain predefined threshold (i.e. 5 transactional aborts). In other embodiments, the party requesting the privilege modification through the coherence privilege modification indication causes the indication to be sent by manipulating one or more computer readable storage media locations accessible to the computer component responsible for determining the approval or denial of the request contained in the indication.

In some embodiments, the coherence privilege modification indication directly comprises information denoting the request for change in coherence privilege state indicators associated with one or more selected processors, while in other embodiments the indication comprises a reference to other computer readable storage media locations comprising the request for privilege modification.

Figure 7:
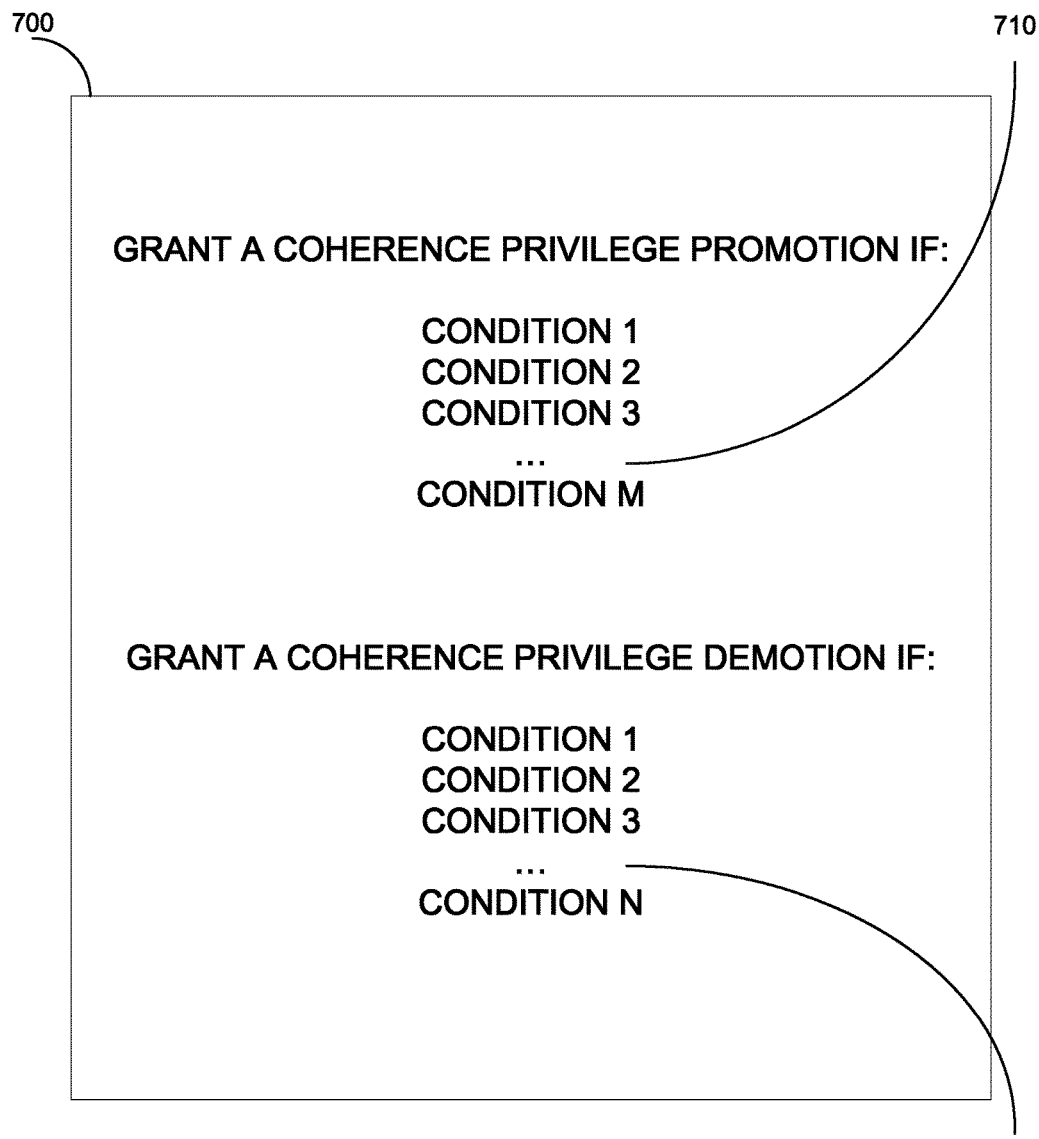
FIG. 7 depicts an operational example of a coherence privilege guideline, in accordance with at least one embodiment of the present invention.

The coherence privilege control program determines whether to approve the request contained in the coherence privilege modification indication based on one or more coherence privilege guidelines available to it. FIG. 7 depicts an example of a set of coherence privilege guidelines 700. One block of guidelines 710 comprises conditions under which the coherence privilege control program grants a request for promotion from a coherence privilege state indicator denoting a lower coherence privilege state to a coherence privilege state indicator denoting a higher coherence privilege. Another block of guidelines 711 comprises conditions under which the coherence privilege control program grants a request for demotion from a coherence privilege state indicator denoting a higher coherence privilege state to a coherence privilege state indicator denoting a lower coherence privilege state.

In some embodiments, the coherence privilege control program makes a different determination about whether to approve a coherence privilege modification indication based on the original coherence privilege state from which modification is requested and the modified coherence privilege state requested. For instance, in a three state coherence range system, the program will grant a request for promotion from the regular state to the priority yield state under conditions $c_1$, $c_2$, and $c_3$, while it will grant a request for promotion from the regular state to super-core state under conditions $c_4$, $c_5$, and $c_6$, and it will grant the request for promotion from the priority yield state to the super-core state under conditions $c_7$, $c_8$, and $c_9$. In addition, the program will grant a request for demotion from the priority yield state to regular state under conditions $c_{10}$, $c_{11}$, and $c_{12}$, from the super-core state to the regular state under conditions $c_{13}$, $c_{14}$, and $c_{15}$, and from the super-core state to the priority yield state under conditions $c_{16}$, $c_{17}$, and $c_{18}$. In the preceding example, condition $c_i$ is not necessarily the same as condition $c_j$ if i does not equal j.

In some embodiments, the coherence privilege control program will always grant a request for some or all modifications in coherence privilege state indicators. In some embodiments, the program will never grant the request for some or all modifications in coherence privilege state indicators. In some embodiments, the program will grant a request for some or all modifications in coherence privilege state indicators if issued at one time, but not the other. For instance, in a three-state coherence range system, the coherence privilege control program grants a request for promotion from the regular state to the super-core state at time $t_1$, but not at time $t_2$, while it grants a request for promotion from the regular state to the priority yield state at both times $t_1$ and $t_2$. In some embodiments, the program approves a request for modification in the coherence privilege state indicators if a minimum number of the conditions are met. For instance, in a two-state coherence range system, the program approves a request for the promotion from the regular state to the super-core state if two of the three conditions $c_1$, $c_2$, and $c_3$ are met.

In some embodiments, the determination of whether to approve a request from a processor for privilege modification contained in a coherence privilege modification indication will be based on other factors in addition to whether the coherence privilege control program determines that one or more of the coherence privilege guidelines are satisfied. Such other factors may comprise one or more of time, rate of access to memory or other shared resources by all the processors collectively, and the memory-intensiveness of the tasks being performed by a transaction being executed by the processor. For instance, in a two-state coherence range system, the coherence privilege control program approves a request for promotion from the regular state to the super-core state requested by a processor in a coherence privilege modification indication if all four of the following conditions are met: (1) the program determines that at least one of the conditions contained in the coherence privilege guidelines for approving a request for promotion from the regular state to the super-core are met; (2) the time is between 9:00 AM and 9:00 PM local time; (3) the current rate of access to memory by all processors collectively is below 100 accesses per second; and (4) the successful execution of the transaction currently being executed by the processor is estimated to require more than 200 memory accesses.

In some embodiments, transactional memory environment is characterized by a behavior that a transactional abort is triggered by a conflict trigger action as to a conflict transaction including a conflict read-set and a conflict write-set, where conflict trigger action is selected from the group consisting of: (i) any of the plurality of processors storing to either the conflict read-set or the conflict write-set; and (ii) any of the plurality of processors loading from the conflict write-set. In at least some of those embodiments, transactional memory environment in which the invention is implemented is characterized by a behavior that a transactional abort is triggered when one or more processors load from the write-set of a transaction being executed by a different processor; or store to the read-set or write-set of such a transaction. The coherence privilege state and behavioral pattern of a processor may affect whether the triggering of a transactional abort leads to the occurrence of a transactional abort.

The coherence privilege control program regulates the coherence privilege state and coherence privilege behavioral pattern of one or more selected processors without the need to resort to the input of other processors in making the program determinations. In one embodiment of the present invention, the program receives a coherence privilege modification indication from a processor when the processor determines that it may be starving. The coherence privilege modification indication comprises a request for change in the coherence privilege state associated with the processor to a state in which the processor can persistently and without interruption access a resource in order to avoid starvation. In determining whether to approve such a coherence privilege modification indication, often known as a "persistent request," the program does not seek the input of other processors through tokens or other mechanisms. Instead, the program determines whether to approve the persistence request based at least in part on one or more available coherence privilege guidelines, the input from the requesting processor, and other information available to the program. In some embodiments, the program may delay the determination for a later time based on the information available to it at different times.

Assigning varied behavioral patterns in coherence interactions to different processors would allow processors executing tasks with higher levels of importance and/or time-sensitiveness to have more secure and prolonged paths of access to shared resources. In some cases, some processors would be guaranteed the execution of one or more transactions in a transactional memory environment. This could in turn reduce latency due to abort requests and increase reliability in execution of some important and/or time-sensitive tasks.

In addition, some embodiments of the present invention allow for new paradigms of coherence interaction between processors in a multi-processor computing environment that transcend existing paradigms designed around mutual aborts and/or coherence request compliance behaviors upon conflict detection. Such new paradigms can reduce overheads produced by excessive aborts in transactional memory environments and allow for creative protocols of shared resource access management between two or more processors.

Finally, the present invention allows processors the ability to manage their resource access needs and coherence behavior independently of the other processors, without the need for collective confirmation and management of individual processor behavioral patterns and privilege states by a larger community of processors. Such an arrangement reduces the risk of the failure and/or reduction in efficiency of coherence privilege control frameworks due to factors such as failure of other processors to act as expected as well as communication problems between processors in efforts to manage coherence behavioral patterns collectively.

Nevertheless, the advantages of the present invention mentioned above are not required to be present in all of the embodiments of the invention and may not be present in all of the embodiments of the invention.

A computer system suitable for executing the coherence privilege control program according to at least one embodiment of the present invention comprises a processing circuit (comprising one or more processors, including one or more computer processors), one or more computer readable storage media, and communications mechanisms between those and other parts of the computer. The possible forms of computer readable storage media comprise persistent storage components (such as the hard disks), main memory components, cache components, registers and other storage media components in the processing circuit, online storage components, and offline bulk storage components.

Figure 8:
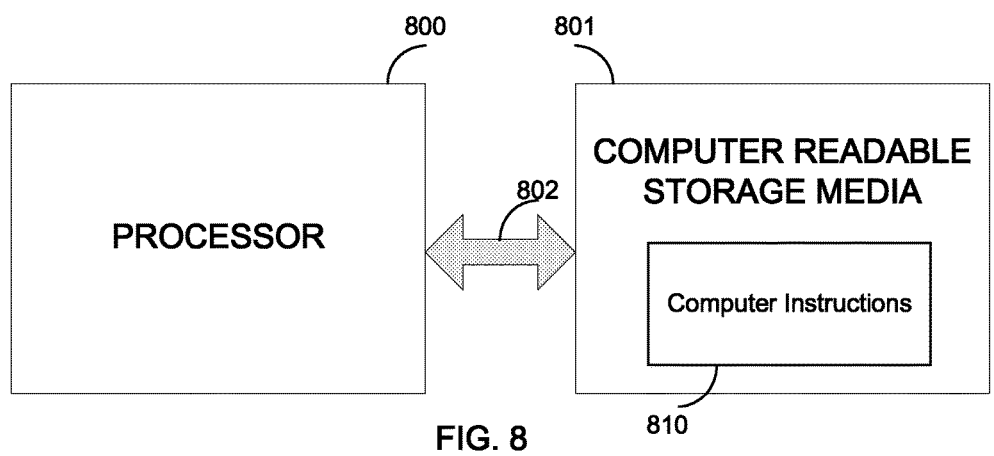
FIG. 8 depicts an example of a computer system suitable for executing the coherence privilege control program, in accordance with at least one embodiment of the present invention.

FIG. 8 depicts an example of such a computer system, comprising a processor 800, a computer readable storage media 801, and a communication mechanism 802 between the processor 800 and the computer readable storage media 801. The computer readable storage media 801 include one or more computer instructions 810. A program may comprise one or more computer instructions (including one or more machine-level instructions). A program may also comprise one or more control logic circuits configured to perform one or more computer tasks (including one or more computer processor tasks).

The computer-implemented method, computer program product, and computer system that embody the present invention as described herein may be implemented in machine hardware using logic circuits, processing circuits, millicode, firmware, and other machine level computing elements. Those skilled in the art of designing computing machines and machine elements will be able to generate machine components designs and machine components that implement the program instructions disclosed herein.

Computer program instructions may be stored on a form of computer readable storage media, fetched into a processor, and decoded into machine-level instructions for the processor to execute. Computer program instruction may be decoded into one or more corresponding machine-level instructions, which correspond to the basic functionalities performed by the processor. The list of machine-level instructions recognized by a processor is called the "instruction set" of that processor. By design, a processor generally possesses the electrical circuitry required for performing the machine-level instructions that are part of its instruction set.

The computer system depicted in FIG. 8 can also be used to execute the computer program product embodied in at least one embodiment of this invention.

Various embodiments of the invention may be implemented in a data processing system suitable for storing and/or executing program code that includes at least one processor (including at least one computer processor) coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media or computer readable storage media. The media has therein, for instance, computer readable program code means or logic (e.g., instructions, code, commands, etc.) to provide and facilitate the capabilities of the present invention. The program instructions or computer program instructions may be understood as stored on one or more computer readable storage media. The article of manufacture can be included as a part of a system (e.g., computer system) or sold separately.

One example of an article of manufacture or a computer program product incorporating one or more aspects of the present invention includes, for instance, one or more computer usable media to store computer readable program code means or logic thereon to provide and facilitate one or more aspects of the present invention. The computer readable storage medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product, the computer program product comprising:
   a processing circuit;
   one or more computer readable storage media device, said computer readable storage media device being readable by said processing circuit;
   wherein said computer readable storage media device store instructions for execution by said processing circuit for performing a method comprising, in a transactional memory environment comprising a plurality of processors:
   identifying one or more coherence privilege state indicators, said coherence privilege state indicators (i) being associated with said one or more selected processors, (ii) indicate a level of privilege associated with the one or more selected processors for coherence control interactions with other processors, and (iii) have at least three possible settings with at least one setting being based on a priority of said one or more selected processors;
   determining a coherence privilege behavioral pattern for said one or more selected processors based on said one or more coherence privilege state indicators, wherein the coherence privilege behavioral pattern (i) is based on the level of privilege and (ii) includes at least three sets of rules that respectively govern, at least in part, how transactions are processed by said one or more selected processors during at least three sequential time periods of operation for said one or more selected processors; and
   processing a transaction by said one or more selected processors based, at least in part, on the coherence privilege behavioral pattern.

2. The computer program product of claim 1, wherein said method further comprises:
   receiving a coherence conflict indication, said coherence conflict indication caused to be sent by one or more requesting parties;
   determining a coherence response based on said coherence privilege behavioral pattern; and
   communicating a coherence response indication comprising said coherence response to a recipient group comprising said one or more requesting parties.

3. The computer program product of claim 2, wherein:
   said coherence conflict indication comprises one or more identifying markers; and
   said coherence response indication comprises an indication of said one or more identifying markers.

4. The computer program product of claim 1, wherein said method further comprises:
   receiving a coherence privilege modification indication, said coherence privilege modification indication denoting a request for change in said one or more coherence privilege state indicators; and
   determining whether to approve said coherence privilege modification indication based on one or more coherence privilege guidelines.

5. The computer program product of claim 1, wherein said one or more coherence privilege state indicators are in a state selected from the group consisting of a regular state and a super-core state.

6. The computer program product of claim 5, wherein determining said coherence privilege behavioral pattern comprises:
   receiving a coherence conflict indication, said coherence conflict indication caused to be sent by one or more requesting parties;
   aborting a transaction being executed by said one or more selected processors if said one or more coherence privilege state indicators are in a regular state; and
   refusing to abort said transaction if said one or more coherence privilege state indicators are in a super-core state.

7. The computer program product of claim 1, wherein said transactional memory environment is characterized by a behavior that a transactional abort is triggered by a conflict trigger action as to a conflict transaction including a conflict read-set and a conflict write-set, said conflict trigger action being selected from the group consisting of:

any of said plurality of processors storing to either said conflict read-set or said conflict write-set; and any of said plurality of processors loading from said conflict write-set.

8. A computer system, the computer system comprising:

a processing circuit;

one or more computer readable storage media device;

wherein the computer system is configured to perform a method comprising, in a transactional memory environment comprising a plurality of processors:

identifying one or more coherence privilege state indicators, said coherence privilege state indicators (i) being associated with said one or more selected processors, (ii) indicate a level of privilege associated with the one or more selected processors for coherence control interactions with other processors and (iii) have at least three possible settings with at least one setting being based on a priority of said one or more selected processors;

determining a coherence privilege behavioral pattern for said one or more selected processors based on said one or more coherence privilege state indicators, wherein the coherence privilege behavioral pattern (i) is based on the level of privilege and (ii) includes at least three sets of rules that respectively govern, at least in part, how transactions are processed by said one or more selected processors during at least three sequential time periods of operation for said one or more selected processors; and processing a transaction by said one or more selected processors based, at least in part, on the coherence privilege behavioral pattern.

9. The computer system of claim 8, wherein said method further comprises:

receiving a coherence conflict indication, said coherence conflict indication caused to be sent by one or more requesting parties;

determining a coherence response based on said coherence privilege behavioral pattern; and communicating a coherence response indication comprising said coherence response to a recipient group comprising said one or more requesting parties.

10. The computer system of claim 8, wherein said method further comprises:

receiving a coherence privilege modification indication, said coherence privilege modification indication denoting a request for change in said one or more coherence privilege state indicators; and determining whether to approve said coherence privilege modification indication based on one or more coherence privilege guidelines.

11. The computer system of claim 8, wherein said one or more coherence privilege state indicators are in a state selected from the group consisting of a regular state and a super-core state.

12. The computer system of claim 11, wherein determining said coherence privilege behavioral pattern comprises:

receiving a coherence conflict indication, said coherence conflict indication caused to be sent by one or more requesting parties;

aborting a transaction being executed by said one or more selected processors if said one or more coherence privilege state indicators are in a regular state; and refusing to abort said transaction if said one or more coherence privilege state indicators are in a super-core state.

13. The computer system of claim 8, wherein said transactional memory environment is characterized by a behavior that a transactional abort is triggered by a conflict trigger action as to a conflict transaction including a conflict read-set and a conflict write-set, said conflict trigger action being selected from the group consisting of:

any of said plurality of processors storing to either said conflict read-set or said conflict write-set; and any of said plurality of processors loading from said conflict write-set.

14. The computer system of claim 9, wherein:

said coherence conflict indication comprises one or more identifying markers; and said coherence response indication comprises an indication of said one or more identifying markers.

\* \* \* \* \*